United States Patent
Köcher et al.

(10) Patent No.: US 11,739,212 B2
(45) Date of Patent: Aug. 29, 2023

(54) ALKOXY-SILANE-MODIFIED POLYUREA COMPOUNDS BASED ON A MIXTURE OF DIALKOXY AND TRIALKOXY SILANES

(71) Applicant: Covestro Deutschland AG, Leverkusen (DE)

(72) Inventors: Jürgen Köcher, Langenfeld (DE); Thomas Fulsche, Langenfeld (DE); Thomas Schüttler, Cologne (DE); Marianne Struwe, Langenfeld (DE); Matthias Wintermantel, Hürth (DE)

(73) Assignee: Covestro Deutschland AG, Leverkusen (DE)

(*) Notice: Subject to any disclaimer, the term of this patent is extended or adjusted under 35 U.S.C. 154(b) by 461 days.

(21) Appl. No.: 16/958,703

(22) PCT Filed: Dec. 20, 2018

(86) PCT No.: PCT/EP2018/086076
§ 371 (c)(1),
(2) Date: Jun. 27, 2020

(87) PCT Pub. No.: WO2019/129611
PCT Pub. Date: Jul. 4, 2019

(65) Prior Publication Data
US 2020/0354570 A1    Nov. 12, 2020

(30) Foreign Application Priority Data

Dec. 28, 2017 (EP) .................................. 17210825

(51) Int. Cl.
| C08L 75/02 | (2006.01) |
| C08G 18/38 | (2006.01) |
| C08G 18/78 | (2006.01) |
| C08G 18/79 | (2006.01) |
| C09D 5/08 | (2006.01) |
| C09D 175/02 | (2006.01) |

(52) U.S. Cl.
CPC .......... *C08L 75/02* (2013.01); *C08G 18/3893* (2013.01); *C08G 18/7837* (2013.01); *C08G 18/791* (2013.01); *C09D 5/08* (2013.01); *C09D 175/02* (2013.01); *C08G 2150/90* (2013.01)

(58) Field of Classification Search
None
See application file for complete search history.

(56) References Cited

U.S. PATENT DOCUMENTS

| 3,627,722 | A  | * | 12/1971 | Seiter ..................... | C08G 18/10 |
| | | | | | 528/48 |
| 5,364,955 | A  |   | 11/1994 | Zwiener et al. | |
| 6,515,096 | B2 | * | 2/2003 | Windmueller ......... | C07F 7/1804 |
| | | | | | 528/25 |
| 7,557,173 | B2 | * | 7/2009 | Bachon ................ | C08G 18/809 |
| | | | | | 525/477 |
| 8,372,514 | B2 | * | 2/2013 | Oertli ..................... | C08G 18/10 |
| | | | | | 524/538 |
| 2009/0264612 | A1 | * | 10/2009 | Stanjek ................. | C08G 77/26 |
| | | | | | 556/407 |
| 2011/0319563 | A1 | * | 12/2011 | Yamashita ................ | B41C 1/05 |
| | | | | | 525/61 |
| 2012/0067249 | A1 | * | 3/2012 | Woods .................. | C07F 7/1804 |
| | | | | | 556/428 |
| 2014/0328781 | A1 | * | 11/2014 | Kergosien ................ | A61Q 1/10 |
| | | | | | 424/61 |

(Continued)

FOREIGN PATENT DOCUMENTS

| DE | 4237468 A1 | 5/1994 |
| DE | 102005045228 A1 | 4/2007 |

(Continued)

OTHER PUBLICATIONS

Moreau, Joël JE, et al. "Lamellar organo-bridged silicones." Journal of sol-gel science and technology 32.1 (2004): 63-67. (Year: 2004).*
International Preliminary Report on Patentability received for PCT Patent Application No. PCT/EP2018/086076, dated Jul. 9, 2020, 12 pages (7 pages of English Translation and 5 pages of Original Document).
International Search Report and Written Opinion received for PCT Patent Application No. PCT/EP2018/086076, dated Mar. 22, 2019, 14 pages (6 pages of English Translation and 8 pages of Original Document).

* cited by examiner

*Primary Examiner* — Robert S Loewe
(74) *Attorney, Agent, or Firm* — The Webb Law Firm

(57) ABSTRACT

The invention relates to a polyurea compound, which can be produced by reacting a polyisocyanate with a dialkoxy amino silane according to general formula $R^1(R^1O)_2Si(CH_2)_mNHR^2$ and optionally also with a trialkoxy amino silane according to general formula $(R^1O)_3Si(CH_2)_nNHR^2$ wherein the groups $R^1$ are selected independently from one another from $C_1$-$C_{20}$-alkyl or $C_6$-$C_{20}$-aryl, n and m are each whole numbers between 1 and 4, the groups $R^2$ are selected independently from one another from —H, $C_1$-$C_2O$-alkyl, C3-C12-cycloalkyl, and —$CHR^3CH_2COOR^4$, the groups $R^3$ are selected independently from one another from H, $C_1$-$C_{20}$-alkyl and —$COOR^4$, and the groups $R^4$ represent $C_1$-$C_{20}$-alkyl independently from one another. The invention also relates to the use of the compound as a binder for producing coatings.

14 Claims, No Drawings

(56) References Cited

U.S. PATENT DOCUMENTS

2016/0244606 A1    8/2016   Ravichandran et al.

FOREIGN PATENT DOCUMENTS

| DE | 102012204298 A1 | 9/2013 |
|----|----|----|
| EP | 0649866 A1 | 4/1995 |
| EP | 0924231 A1 | 6/1999 |
| EP | 0949284 A1 | 10/1999 |
| WO | 2012/002932 A1 | 1/2012 |

ALKOXY-SILANE-MODIFIED POLYUREA COMPOUNDS BASED ON A MIXTURE OF DIALKOXY AND TRIALKOXY SILANES

CROSS-REFERENCE TO RELATED APPLICATIONS

This application is a national stage application (under 35 U.S.C. § 371) of PCT/EP2018/086076, filed Dec. 20, 2018, which claims benefit of European Application No. 17210825.0, filed Dec. 28, 2017, both of which are incorporated herein by reference in their entirety.

FIELD OF THE INVENTION

The present invention relates to alkoxysilane-modified polyurea compounds based on dialkoxysilanes or on a mixture of dialkoxy- and trialkoxysilanes and to the use thereof as a binder in coatings, in particular in the field of corrosion protection.

PRIOR ART

The use of alkoxysilane-modified polyurea compounds as binders in coatings is known. The compounds have terminal alkoxysilane groups which have the property of hydrolyzing on contact with small amounts of moisture to give organosilanols and of polymerizing via subsequent condensation to give organosiloxanes. This polymerization leads to a cross-linking of the silane-modified polyurea compound, also referred to as curing. On account of this capability for further crosslinking, silane-modified polyurea compounds are also referred to as silane-terminated prepolymers (STP) and are suitable as binders for moisture-curing coatings.

EP 0 949 284 A1 describes silane-modified polyisocyanates having a content of free isocyanate groups of 0.2% to 20% by weight. These polyisocyanates are suitable as binders in combination with an isocyanate-reactive component to produce two-component coatings, adhesives and sealants. The presence of free isocyanate groups is required for the use in two-component systems. However, due to the high reactivity of free isocyanate groups, these compounds and the compositions containing these compounds present a possible toxicological hazard for the user. For this reason, there is a need for isocyanate-free binders.

EP 0 924 231 A1 describes aqueous dispersions of polyurethane/polyurea compounds based on polyisocyanates which have been reacted with polyols and aminosilanes. In order to ensure dispersibility in water, the compounds preferably have additional anionic groups. These compounds may for example be used as binders for coatings, adhesives and sealants. Use in anticorrosion systems, in particular in non-aqueous topcoat coatings, is not disclosed.

DE 10 2012 204 298 A1 describes binders based on polyisocyanates which are reacted with secondary aminosilanes to give silane-modified polyurea compounds. Aminosilanes used here are secondary N-alkyl-, N-cycloalkyl- or N-arylaminoalkoxysilanes. Polyisocyanates used are aliphatic or cycloaliphatic, monomeric or oligomeric polyisocyanates. As a result of the virtually quantitative reaction of the polyisocyanate with the aminosilane, these binders contain a very low content of free isocyanate groups. The combination of these binders with specific curing catalysts enables the production of coatings having a high mechanical stability.

WO 2012/002932 A1 describes one-component coatings for use in shipbuilding. These coatings feature a high UV stability. The coatings contain a binder based on polyisocyanates which are reacted with secondary aminosilanes to give silane-modified polyurea compounds. As in DE 10 2012 204 298 A1, the aminosilanes used are secondary N-alkyl-, N-cycloalkyl- or N-arylaminoalkoxysilanes. Likewise, polyisocyanates used are aliphatic or cycloaliphatic, monomeric or oligomeric polyisocyanates.

The binders disclosed in DE 10 2012 204 298 A1 and WO 2012/002932 A1 basically meet the demands on isocyanate-free binders and are suitable for use in coatings, in particular as topcoat in an anticorrosion system.

However, there is still a need for coatings that are inexpensive to produce and have improved technical properties. Of particular interest here is an improvement in the gloss value of the coatings.

DESCRIPTION OF THE INVENTION

For this reason, it is an object of the invention to provide a binder for use in coatings with which the gloss value of the coating can be improved. The binder is intended to be suitable particularly for use in a topcoat of an anticorrosion system. Moreover, the invention is to provide an isocyanate-free and in this respect toxicologically harmless binder. The binder should preferably also not release any methanol during the curing. In addition, the binder should preferably be inexpensive to produce.

Silane-Modified Polyurea Compound

This object is achieved by a silane-modified polyurea compound preparable via reaction of a polyisocyanate with a dialkoxyaminosilane of general formula (I)

$$R^1(R^1O)_2Si(CH_2)_mNHR^2 \quad (I)$$

and optionally additionally with a trialkoxyaminosilane of general formula (II)

$$(R^1O)_3Si(CH_2)_mNHR^2 \quad (II)$$

where the radicals $R^1$ independently of one another are selected from $C_1$-$C_{20}$-alkyl or $C_6$-$C_{20}$-aryl, n and m are each integers between 1 and 4,
the radicals $R^2$ independently of one another are selected from —H, $C_1$-$C_{20}$-alkyl, $C_3$-$C_{12}$-cycloalkyl, and —CHR$^3$CH$_2$COOR$^4$,
the radicals $R^3$ independently of one another are selected from H, $C_1$-$C_{20}$-alkyl and —COOR$^4$, and the radicals $R^4$ independently of one another represent $C_1$-$C_{20}$-alkyl.

The compounds according to the invention are characterized in that they have been functionalized with dialkoxysilane groups or with a mixture of trialkoxy- and dialkoxysilane groups. On account of this feature, coatings which contain the compounds according to the invention as binders display higher gloss values than those coatings which exclusively contain binders having trialkoxysilane groups. In this case, a sufficiently high gloss value is achieved even with a relatively low molar proportion of dialkoxysilane groups.

The compounds according to the invention have a low content of free isocyanate groups. The compounds according to the invention are therefore toxicologically harmless and easy to handle. The content of free isocyanate groups is preferably less than 0.2% by weight, particularly preferably less than 0.01% by weight, most preferably less than 0.001% by weight. Ideally, the compounds do not have any free isocyanate groups within the precision of detection. The content of free isocyanate groups can be determined in accordance with DIN EN ISO 11909:2007-05.

The compounds according to the invention additionally feature a high proportion of silane groups, based on the weight of the compound. This improves the curing properties of coating compositions which comprise the compounds according to the invention as binders. The compounds according to the invention are therefore suitable in particular for the production of quick-drying coatings.

The proportion of silane groups based on the weight of the compound is typically reported as the proportion of silicon based on the weight of the compound and is preferably 0.1% to 10% by weight, preferably 1% to 7% by weight, most preferably 1.5% to 5% by weight. The silicon content may for example be calculated from the amount of aminosilanes used to prepare the compound according to the invention. The silicon content may also be determined by way of inductively coupled plasma atomic emission spectrometry (ICP-OES).

The density of the ethoxysilane groups based on the total weight of the polyurea compound, also referred to as the ethoxysilane functionality based on solids weight, is preferably 2 to 8 eq/kg, particularly preferably 3 to 6 eq/kg, most preferably 3.5 to 4.5 eq/kg. The density of ethoxysilane groups may be calculated from the amount of aminosilanes used to prepare the compound according to the invention.

The compounds preferably have a number-average molecular weight of 300 to 6000 g/mol, preferably 800 to 4000 g/mol, particularly preferably 1000 to 3000 g/mol, most preferably 1000 to 2000 g/mol. The weight-average molecular weight is preferably 500 to 5000 g/mol, preferably 800 to 3000 g/mol, particularly preferably 1500 to 2500 g/mol. The number-average/weight-average molecular weight can be ascertained by means of gel permeation chromatography (GPC) in accordance with DIN 55672-1: 2016-03 using THF as eluent against a polystyrene standard.

Polyisocyanates

"Polyisocyanates" within the context of this invention refers to compounds having two or more isocyanate groups.

The simplest representatives of this group are the monomeric diisocyanates of the general structural formula O=C=N—R—N=C=O, where R is typically an aliphatic, cycloaliphatic or aromatic radical. Examples of suitable monomeric diisocyanates are 1,4-diisocyanatobutane (BDI), 1,5-diisocyanatopentane (PDI), hexamethylene 1,6-diisocyanate (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-iso-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicyclohexylmethane (H12MDI), 1,3- and 1,4-bis(isocyanatomethyl)cyclohexane, bis(isocyanatomethyl)norbornane (NBDI), 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetramethyl-1,1'-bi(cyclohexyl), 1,8-diisocyanato-p-menthane, 1,3-diisocyanatoadamantane, 1,3-dimethyl-5,7-diisocyanatoadamantane, 1,3- and 1,4-bis(isocyanatomethyl)benzene (xylylene diisocyanate; XDI), 1,3- and 1,4-bis(1-isocyanato-1-methylethyl)benzene (TMXDI), bis(4-(1-isocyanato-1-methylethyl)phenyl) carbonate, 2,4- and 2,6-diisocyanatotoluene (TDI), 2,4'- and 4,4'-diisocyanatodiphenylmethane (MDI), 1,5-diisocyanatonaphthalene and mixtures thereof. Particularly suitable monomeric diisocyanates are 1,5-diisocyanatopentane, hexamethylene 1,6-diisocyanate and isophorone diisocyanate.

Furthermore, the term polyisocyanates also includes oligomeric compounds formed from at least two monomeric polyisocyanates and possessing at least two free isocyanate groups. These oligomeric polyisocyanates preferably include uretdione, iso, allophanate, biuret, iminooxadiazinedione and/or oxadiazinetrione structural units.

Preference is given to using an oligomeric polyisocyanate based on 1,5-diisocyanatopentane, hexamethylene 1,6-diisocyanate or isophorone diisocyanate. Particular preference is given to using an oligomeric polyisocyanate based on hexamethylene 1,6-diisocyanate or isophorone diisocyanate.

An oligomeric polyisocyanate having isocyanurate and allophanate groups is preferably used.

In a particularly preferred embodiment, a polyisocyanate based on isophorone diisocyanate and having isocyanurate and allophanate groups is used. This is an oligomeric polyisocyanate which is prepared starting from isophorone diisocyanate by means of methods known per se. A portion of the isocyanate groups present in the isophorone diisocyanate are subjected to a trimerization reaction in the presence of a suitable catalyst. An alkanol is added to the reaction mixture before, during and/or following the trimerization, so that a portion of the isocyanate groups react with the alkanol via the corresponding urethane stage to give the allophanate. The details of this preparation process are known to those skilled in the art and by way of example are disclosed in EP 0 649 866 A1.

The alkanol used here is preferably an aliphatic alcohol having 1 to 6 carbon atoms or mixtures of these alcohols. Examples of suitable alcohols are methanol, ethanol, n- and isopropanol, n-butanol, n-pentanol, 2-ethyl-1-hexanol, 1-octanol, 1-dodecanol, 1-hexadecanol. n-Butanol, n-pentanol and 2-ethyl-1-hexanol are particularly preferred. A mixture comprising n-butanol is preferably used. A mixture comprising n-butanol and n-pentanol is particularly preferably used.

The polyisocyanate preferably has a content of isocyanate groups of 8% to 20% by weight, preferably 10% to 18% by weight, particularly preferably 10% to 15% by weight.

The polyisocyanate preferably has a content of isocyanurate groups, calculated as $C_3N_3O_3$ (molecular weight 126 g/mol), of 3.5% to 24% by weight, preferably 7% to 17% by weight.

The polyisocyanate preferably has a content of allophanate groups, calculated as $C_2HN_2O_3$ (molecular weight 101 g/mol), of 2.5% to 23% by weight, preferably 5% to 16% by weight.

The polyisocyanate preferably has a total content of isocyanate groups, isocyanurate groups and allophanate groups of 28% to 51% by weight.

A particularly suitable polyisocyanate is commercially available under the Desmodur XP 2565 trade name.

The oligomeric polyisocyanate based on isophorone diisocyanate and having isocyanurate and allophanate groups may also be used in the form of a mixture comprising further polyisocyanates. The proportion of pure polyisocyanate based on isophorone diisocyanate and having isocyanurate and allophanate groups in this mixture is by preference at least 50% by weight, preferably at least 60% by weight, most preferably at least 75% by weight, in each case based on the total amount of pure polyisocyanate.

Aminosilanes

The compounds comprise silane groups that are derived from aminosilanes of general formulae (I) or a mixture of aminosilanes of general formulae (I) and (II).

In a preferred embodiment, the compounds according to the invention are preparable via reaction of a polyisocyanate with a dialkoxyaminosilane of general formula (I) and additionally with a trialkoxyaminosilane of general formula (II). These compounds are characterized in that they have been functionalized with a mixture of trialkoxy- and dialkoxysilane groups. These compounds achieve a sufficiently high gloss value even with a relatively low molar proportion of dialkoxysilane groups. In this way, it is possible to dispense with the use of exclusively dialkoxysilane-functionalized binders and to replace these with dialkoxy-/trialkoxysilane-functionalized binders that are less expensive to produce and have only a low content of dialkoxysilane groups.

The proportion of dialkoxyaminosilanes of general formula (I), based on the total molar amount of aminosilanes of general formulae (I) and (II), is preferably 5 to 90 mol %, particularly preferably 10 to 70 mol %, most preferably 10 to 50 mol %.

As a result of the fact that the radicals $R^1$ are selected independently of one another, they can also represent different $C_1$-$C_{20}$-alkyl and $C_6$-$C_{20}$-aryl groups in a molecule. For instance, the definition according to the invention of the radicals $R^1$ also encompasses, for example, a diethoxymethylsilyl group.

The compounds preferably comprise ethoxy- or methoxysilane groups. The radicals $R^1$ are accordingly preferably ethyl and/or methyl. The radicals $R^1$ are particularly preferably ethyl.

The aminosilanes of formulae (I) and (II) are particularly preferably aminopropylsilanes with n=3.

They are preferably secondary aminosilanes in which the radicals $R^2$ independently of one another are selected from $C_1$-$C_{20}$-alkyl, $C_3$-$C_{12}$-cycloalkyl, and —$CHR^3CH_2COOR^4$. The radicals $R^2$ are preferably —$CHR^3CH_2COOR^4$.

The aminosilanes are particularly preferably secondary aminosilanes which can be obtained by reaction of a primary aminosilane with esters of maleic acid, fumaric acid or cinnamic acid.

Accordingly, $R^3$ is preferably $C_6$-$C_{12}$-aryl or —$COOR^4$, particularly preferably phenyl or —$COOR^4$. $R^3$ is most preferably —$COOR^4$.

The radicals $R^4$ are preferably selected from $C_1$-$C_6$-alkyl, for example methyl, ethyl, n- or isopropyl, n-butyl, isobutyl, sec-butyl, tert-butyl, n-pentyl, 2-pentyl or 3-pentyl. The radicals $R^4$ are most preferably ethyl or methyl.

In a particularly preferred embodiment, the aminosilanes of formulae (I) and (II) used are the compounds diethyl N-(3-triethoxysilylpropyl)aspartate and diethyl N-(3-diethoxymethylsilylpropyl)aspartate.

Additional Alcohols and Amines

The compounds preferably have further urea/urethane groups which are obtainable via reaction of a portion of the isocyanate groups of the polyisocyanate with a dialkylamine/an alcohol. The proportion of silane-modified end groups can be adjusted in this way.

The dialkylamine used can preferably be a compound of the formula $NH(R^5)_2$, where $R^5$ in each case is $C_1$-$C_6$-alkyl. A particularly preferred dialkylamine is di-n-butylamine.

Alcohols contemplated here are preferably aliphatic alcohols having 1 to 20 carbon atoms. Within the context of this invention, this also includes alkoxylated alcohols comprising ether groups. Particular preference is given to aliphatic alcohols having 1 to 16 carbon atoms. The alcohols are particularly preferably monoalcohols. Examples of suitable alcohols are methanol, ethanol, n- and isopropanol, n-butanol, ethylene glycol monobutyl ether, 2-ethylhexanol, 1-octanol, 1-dodecanol, 1-hexadecanol.

The proportion of dialkylamine/alcohol, expressed as a molar amount of amino/hydroxy groups based on the molar amount of NCO groups of the polyisocyanate, is preferably 10% to 50%, particularly preferably 20% to 40%, most preferably 25% to 35%.

Crosslinking Polyols

The alcohols used can also be polyols, which may result in a pre-crosslinking of the polyisocyanate molecules. However, the compound according to the invention is preferably an uncrosslinked compound and no polyols are used.

Polyols that can be used preferably have a number-average molecular weight $M_n$ of 400 to 8000 g/mol, preferably of 400 to 6000 g/mol and particularly preferably of 400 to 3000 g/mol. The hydroxyl number thereof is preferably 22 to 700 mg KOH/g, preferably 30 to 300 mg KOH/g and particularly preferably 40 to 250 mg KOH/g. The polyols preferably have an OH functionality of 1.5 to 6, preferably of 1.7 to 5 and particularly preferably of 1.8 to 5.

Polyols that can be used are the organic polyhydroxyl compounds known in polyurethane coating technology, for example the standard polyester polyols, polyacrylate polyols, polyurethane polyols, polycarbonate polyols, polyether polyols, polyester polyacrylate polyols and poly, polyurethane polyester polyols, polyurethane polyether polyols, polyurethane polycarbonate polyols, polyester polycarbonate polyols, phenol/formaldehyde resins, alone or in mixtures. Preference is given to polyester polyols, polyether polyols, polyacrylate polyols or polycarbonate polyols, particular preference is given to polyether polyols, polyester polyols and polycarbonate polyols.

Polyether polyols include, for example, the polyaddition products of the styrene oxides, of ethylene oxide, of propylene oxide, of tetrahydrofuran, of butylene oxide, of epichlorohydrin, and the mixed addition and grafting products thereof, and the polyether polyols obtained by condensation of polyhydric alcohols or mixtures thereof and those obtained by alkoxylation of polyhydric alcohols, amines and amino alcohols.

Suitable hydroxy-functional polyethers have OH functionalities of 1.5 to 6.0, preferably 1.8 to 5, OH numbers of 22 to 700 and preferably of 40 to 600 mg KOH/g of solids, and molecular weights $M_n$ of 106 to 4000 g/mol, preferably of 200 to 3500, for example alkoxylation products of hydroxy-functional starter molecules such as ethylene glycol, propylene glycol, butanediol, hexanediol, trimethylolpropane, glycerol, pentaerythritol, sorbitol or mixtures of these and also other hydroxy-functional compounds with propylene oxide or butylene oxide. Preferred polyether components are polypropylene oxide polyols, polyethylene oxide polyols and polytetramethylene oxide polyols.

Examples of polyester polyols that are of good suitability are the polycondensates, known per se, of di- and optionally tri- and tetraols and di- and optionally tri- and tetracarboxylic acids or hydroxycarboxylic acids or lactones. Instead of the free polycarboxylic acids, it is also possible to use the corresponding polycarboxylic anhydrides or corresponding polycarboxylic esters of lower alcohols to prepare the polyesters. Examples of suitable diols are ethylene glycol, butylene glycol, diethylene glycol, triethylene glycol, polyalkylene glycols such as polyethylene glycol, and also propane-1,2-diol, propane-1,3-diol, butane-1,3-diol, butane-1,4-diol, hexane-1,6-diol and isomers, neopentyl glycol or neopentyl glycol hydroxypivalate, preference being given to the three latter compounds. In order to achieve a functionality >2, it is optionally possible to use proportions of polyols having a functionality of 3, for example trimethylolpropane, glycerol, erythritol, pentaerythritol, trimethylolbenzene or trishydroxyethyl isocyanurate.

Useful dicarboxylic acids include, for example, phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, 2-methylsuccinic acid, 3,3-diethylglutaric acid, 2,2-dimethylsuccinic acid. Anhydrides of these acids are likewise usable, where they exist. For the purposes of the present invention, the anhydrides are consequently covered by the expression "acid". It is also possible to use monocarboxylic acids such as benzoic acid and hexanecarboxylic acid, provided that the mean functionality of the polyol is ≥2. Saturated aliphatic or aromatic acids are preferred, such as adipic acid or isophthalic acid. One example of a polycarboxylic acid for optional additional use in smaller amounts here is trimellitic acid.

Examples of hydroxycarboxylic acids that may be used as co-reactants in the preparation of a polyester polyol having terminal hydroxyl groups include hydroxycaproic acid, hydroxybutyric acid, hydroxydecanoic acid, hydroxystearic acid and the like. Usable lactones include ε-caprolactone, butyrolactone and homologs.

Preference is given to polyester polyols based on butanediol and/or neopentyl glycol and/or hexanediol and/or ethylene glycol and/or diethylene glycol with adipic acid and/or phthalic acid and/or isophthalic acid. Particular preference is given to polyester polyols based on butanediol and/or neopentyl glycol and/or hexanediol with adipic acid and/or phthalic acid.

Possible usable polyesters are also polycaprolactone polyols as are commercially available from Perstorp in the form of CAPA polycaprolactone polyols.

The useful polycarbonate polyols are obtainable by reaction of carbonic acid derivatives, for example diphenyl carbonate, dimethyl carbonate or phosgene, with diols. Useful diols of this kind include, for example, ethylene glycol, propane-1,2- and 1,3-diol, butane-1,3- and 1,4-diol, hexane -1,6-diol, octane-1,8-diol, neopentyl glycol, 1,4-bishydroxymethylcyclohexane, 2-methylpropane-1,3-diol, 2,2,4-trimethylpentane-1,3-diol, dipropylene glycol, polypropylene glycols, dibutylene glycol, polybutylene glycols, bisphenol A, tetrabromobisphenol A, but also lactone-modified diols. Preferably, the diol component contains 40% to 100% by weight of hexane-1,6-diol and/or hexanediol derivatives, preferably those having not only terminal OH groups but also ether or ester groups, for example products which are obtained by reaction of 1 mol of hexanediol with at least 1 mol, preferably 1 to 2 mol, of ε-caprolactone, or by etherification of hexanediol with itself to give di- or trihexylene glycol. It is also possible to use polyether polycarbonate polyols.

Preference is given to polycarbonate polyols based on dimethyl carbonate and hexanediol and/or butanediol and/or ε-caprolactone. Very particular preference is given to polycarbonate polyols based on dimethyl carbonate and hexanediol and/or ε-caprolactone.

Instead of the above-described polymeric polyether, polyester or polycarbonate polyols, it is also possible to use low molecular weight polyols in the molar mass range from 62-400 g/mol for the preparation of the compounds according to the invention. Suitable low molecular weight polyols are short-chain, i.e. containing 2 to 20 carbon atoms, aliphatic, araliphatic or cycloaliphatic diols or triols. Examples of diols are ethylene glycol, diethylene glycol, triethylene glycol, tetraethylene glycol, dipropylene glycol, tripropylene glycol, propane-1,2-diol, propane-1,3-diol, butane-1,4-diol, neopentyl glycol, 2-ethyl-2-butylpropanediol, trimethylpentanediol, 2,2,4-trimethylpentane-1,3-diol, positionally isomeric diethyloctanediols, 1,3-butylene glycol, cyclohexanediol, cyclohexane -1,4-dimethanol, hexane-1,6-diol, cyclohexane-1,2- and -1,4-diol, hydrogenated bisphenol A (2,2-bis(4-hydroxycyclohexyl)propane), 2,2-dimethyl-3-hydroxypropyl 2,2-dimethyl-3-hydroxypropionate. Preference is given to butane-1,4-diol, cyclohexane-1,4-dimethanol and hexane-1,6-diol. Examples of suitable triols are trimethylolethane, trimethylolpropane or glycerol, preference being given to trimethylolpropane.

The stated polyols can be used alone or in a mixture.

Preparation Process

The invention also relates to a process for preparing the polyurea compound according to the invention by
a) providing a polyisocyanate,
b) reacting at least a portion of the NCO groups of the polyisocyanate with a dialkoxyaminosilane of general formula (I)

c) optionally reacting a portion of the NCO groups of the polyisocyanate with a trialkoxyaminosilane of general formula (II)

where the radicals $R^1$ independently of one another are selected from $C_1$-$C_{20}$-alkyl or $C_6$-$C_{20}$-aryl, n and m are each integers between 1 and 4,
the radicals $R^2$ independently of one another are selected from —H, $C_1$-$C_{20}$-alkyl, $C_3$-$C_{12}$-cycloalkyl, and —CHR$^3$CH$_2$COOR$^4$,
the radicals $R^3$ independently of one another are selected from H, $C_1$-$C_{20}$-alkyl and —COOR$^4$, and
the radicals $R^4$ independently of one another represent $C_1$-$C_{20}$-alkyl.

In one embodiment, the process comprises a step d) of additionally reacting a portion of the NCO groups of the polyisocyanate with a dialkylamine or an alcohol.

Steps b) to d) can be performed simultaneously or in succession in any desired sequence.

The addition of the dialkylamine or the alcohol in step d) is preferably effected before the addition of the aminosilanes of general formulae (I) and (II). The aminosilanes of general formulae (I) and (II) are preferably added simultaneously.

Steps b) to d) are implemented in the liquid phase, optionally in the presence of an additional solvent. The reaction of polyisocyanates with aminosilanes is known in principle to those skilled in the art. The reaction of the NCO groups of the polyisocyanate with the aminosilane or with the dialkylamine is preferably effected at a temperature of less than 130° C., preferably in the range from 30 to 80° C. The reaction of the NCO groups of the polyisocyanate with the alcohol is preferably conducted at temperatures from 20° C. to 200° C., preferably 40° C. to 140° C. and particularly preferably from 60° C. to 120° C. The solvent added is preferably 1-methoxy-2-propyl acetate or butyl acetate.

The free NCO groups can be reacted with the dialkylamine without catalysis.

As described above, the alcohol used can be a monoalcohol or a polyol. A monoalcohol is preferably used. The reaction of the free NCO groups with monoalcohols or polyols to give urethane groups can be effected without catalysis, but is preferably accelerated by catalysis. Useful urethanization catalysts for accelerating the NCO—OH reaction are those known per se to those skilled in the art such as for example organotin compounds, bismuth compounds, zinc compounds, titanium compounds, zirconium compounds or aminic catalysts.

In the preparation process, this catalyst component, if used, is used in amounts from 0.001% by weight to 5.0% by weight, preferably 0.005% by weight to 2% by weight and particularly preferably 0.01% by weight to 1% by weight, based on the total weight of the reaction mixture.

The reaction is preferably continued until complete conversion of the NCO groups of the polyisocyanate has been achieved. The progress of the reaction is expediently monitored by checking the NCO content and is ended when the corresponding theoretical NCO content has been reached and is constant. This can be monitored by suitable measuring instruments installed in the reaction vessel and/or using analyses of withdrawn samples. Suitable processes are known to those skilled in the art. These are for example, viscosity measurements, measurements of the NCO content, of the refractive index, of the OH content, gas chromatography (GC), nuclear magnetic resonance spectroscopy (NMR), infrared spectroscopy (IR) and near near-infrared spectroscopy (NIR). The NCO content of the mixture is preferably determined by titrimetric means.

It is unimportant whether the process is conducted continuously, for example in a static mixer, extruder or kneader, or batchwise, for example in a stirred reactor. The process is preferably conducted in a stirred reactor.

Coatings

The invention also relates to a moisture-curing coating comprising the polyurea compound according to the invention and a crosslinking catalyst. The coating according to the invention is preferably a topcoat for an anticorrosion system.

The proportion of the polyurea compound according to the invention in the coating is by preference 10% to 80% by weight, preferably 20% to 70% by weight, particularly preferably 30% to 60% by weight, based on the total weight of the coating.

Crosslinking Catalysts

Within the context of this invention, a crosslinking catalyst refers to a compound which in the presence of water catalyzes the condensation reaction of the alkoxysilane groups of the polyurea compound according to the invention. Crosslinking catalysts used can be the catalysts known in the prior art. The catalyst may for example be a metal catalyst or a phosphorus-containing and/or nitrogen-containing compound.

Suitable metal catalysts preferably comprise a metal selected from Zn, Sn, Ti, Zr and Al. They are preferably organozinc compounds, organotin compounds, organotitanates, organozirconates and organoaluminates. The organotitanates, organozirconates and organoaluminates preferably have ligands which are selected from an alkoxy group, sulfonate group, carboxylate group, dialkylphosphate group, dialkylpyrophosphate group and acetylacetonate group, where all ligands may be identical or different from each other. Suitable metal catalysts have been described by way of example in US 2016/0244606 A1.

Examples of suitable phosphorus-containing catalysts are substituted phosphonic diesters and diphosphonic diesters, preferably from the group consisting of acyclic phosphonic diesters, cyclic phosphonic diesters, acyclic diphosphonic diesters and cyclic diphosphonic diesters. Catalysts of this kind have been described by way of example in the German patent application DE-A-102005045228.

In particular, however, substituted phosphoric monoesters and phosphoric diesters are used, preferably from the group consisting of acyclic phosphoric diesters and cyclic phosphoric diesters, particularly preferably amine adducts of phosphoric monoesters and diesters.

Acidic catalysts such as sulfonic acids are also usable as catalysts, as described in DE 102012204298. In addition, carboxylates can also be used, as likewise described in DE 102012204298.

Catalysts used are very particularly preferably the corresponding amine-blocked phosphoric esters, and here in particular amine-blocked ethylhexyl phosphates and amine-blocked phenyl phosphates, very particularly preferably amine-blocked bis(2-ethylhexyl) phosphates.

Suitable examples of amines used to block the phosphoric esters include in particular tertiary amines, for example bicyclic amines, such as for example diazabicyclooctane (DABCO), 5-diazabicyclo[4.3.0]non-5-ene (DBN), 1,8-diazabicyclo[5.4.0]undec-7-ene (DBU), dimethyldodecylamine or triethylamine.

Suitable nitrogen-containing catalysts are for example amidines; amines such as in particular N-ethyldiisopropylamine, N,N,N',N'-tetramethylalkylenediamines, polyoxyalkyleneamines, 1,4-diazabicyclo[2.2.2]octane; aminosilanes such as 3-aminopropyltrimethoxysilane, 3-aminopropyldimethoxymethylsilane, N-(2-aminoethyl)-3-aminopropyltrimethoxysilane, N-(2-aminoethyl)-3-aminoprop ylmethyldimethoxysilane, N-(2-aminoethyl)-N'-[3-(trimethoxysilyl)propyl]ethylenediamine and analogs thereof having ethoxy or isopropoxy groups instead of methoxy groups on the silicon.

Particularly preferred crosslinking catalysts are organotitanates and amidines.

Preferred organotitanates are in particular bis(ethylacetoacetato)diisobutoxytitanium(IV), bis(ethylacetoacetato) diisopropoxytitanium(IV), bis(acetylacetonato)diisopropoxytitanium(IV), bis(acetylacetonato) diisobutoxytitanium(IV), tris(oxyethyl) amineisopropoxytitanium(IV), bis[tris(oxyethyl)amine] diisopropoxytitanium(IV), bis(2-ethylhexane-1,3-dioxy) titanium(IV), tris[2-((2-aminoethyl)amino)ethoxy] ethoxytitanium(IV), bis(neopentyl(diallyl) oxydiethoxytitanium(IV), titanium(IV) tetrabutoxide, tetra (2-ethylhexyloxy)titanate, tetra(isopropoxy)titanate and polybutyl titanate.

Preferred amidines are in particular 1,8-diazabicyclo [5.4.0]undec-7-ene (DBU), 1,5-diazabicyclo[4.3.0]non-5-ene (DBN), 6-dibutylamino-1,8-diazabicyclo[5.4.0]undec-7-ene; methyl-triazabicyclodecene, guanidines such as tetramethylguanidine, 2-guanidinobenzimidazole, acetylacetoneguanidine, 1,3-di-o-tolylguanidine, 1,3-diphenylguanidine, tolylbiguanidine, 2-tert-butyl -1,1,3,3-tetramethylguanidine; and imidazoles such as N-(3-trimethoxysilylpropyl)-4,5-dihydroimidazole and N-(3-triethoxysilylpropyl)-4,5-dihydroimidazole.

The crosslinking catalyst used is particularly preferably 1,8-diazabicyclo[5.4.0]undec-7-ene (DBU) or 1,5-diazabicyclo[4.3.0]non-5-ene (DBN).

The proportion of crosslinking catalyst in the coating is by preference 0.001% to 5% by weight, preferably 0.005% to 2% by weight, particularly preferably 0.01% to 1% by weight, based on the total weight of the coating.

Further Coating Constituents

The coating can additionally contain solvents, fillers, pigments and other coatings additives known in coatings technology.

Examples of suitable solvents are 2-ethylhexanol, acetone, 2-butanone, methyl isobutyl ketone, butyl acetate, ethyl acetate, 1-methoxy-2-propyl acetate (MPA), 3-methoxy-1-butyl acetate, propylene n-butyl ether, toluene, methyl ethyl ketone, xylene, 1,4-dioxane, diacetone alcohol, N-methylpyrrolidone, dimethylacetamide, dimethylformamide, dimethyl sulfoxide, methyl ethyl ketone, solvent naphtha (hydrocarbon mixture) or any mixtures of such solvents.

Preferred solvents in this case are the solvents which are standard per se in polyurethane chemistry, such as butyl acetate, ethyl acetate, 1-methoxy-2-propyl acetate (MPA), 3-methoxy-1-butyl acetate, propylene n-butyl ether, toluene, 2-butanone, xylene, 1,4-dioxane, methyl ethyl ketone, N-methylpyrrolidone, dimethylacetamide, dimethylformamide, methyl ethyl ketone, solvent naphtha (hydrocarbon mixture) or any mixtures of such solvents.

Particularly preferred solvents are solvents such as butyl acetate, 1-methoxy-2-propyl acetate (MPA), 3-methoxy-1-butyl acetate, ethyl acetate, propylene n-butyl ether, methyl ethyl ketone, toluene, xylene, solvent naphtha (hydrocarbon mixture) and also mixtures thereof.

The proportion of solvent in the coating is by preference 0.5% to 40% by weight, preferably 1% to 30% by weight, particularly preferably 2% to 25% by weight.

Suitable coatings additives are in particular the matting agents, flame retardants, leveling auxiliaries, wetting and dispersing additives, defoamers, deaerators, antioxidants, light stabilizers, water scavengers, thickeners and thixotropic agents known in coatings technology and as are described for example in the "Lehrbuch der Lacke und Beschichtungen, Band III, Lösemittel, Weichmacher, Additive, Zwischenprodukte" [Textbook on Paints and Coatings, volume III, Solvents, Plasticizers, Additives, Intermediates], H. Kittel, Verlag W. A. Colomb in der Heenemann GmbH, Berlin-Oberschwandorf, 1976, pp. 237-398.

The proportion of coatings additives in the coating is by preference 0.5% to 15% by weight, preferably 1% to 10% by weight, particularly preferably 2% to 7% by weight, based on the total weight of the coating.

Examples of suitable fillers are barite, chalk or talc. Fillers having a barrier effect can also be used, such as for example platelet-form phyllosilicates or sheet aluminosilicates, graphite, aluminum platelets or barrier pigments such as for example iron mica and nanofillers such as for example clays and aluminum silicates. Wherein the fillers can be used alone or in combination.

The proportion of filler in the coating is by preference 1% to 30% by weight, preferably 3% to 20% by weight, particularly preferably 5% to 15% by weight, based on the total weight of the coating.

Suitable pigments are the pigments known in coatings technology, such as for example titanium dioxide, zinc oxide, iron oxides, chromium oxides or carbon blacks.

The proportion of pigments in a coating is by preference 5% to 40% by weight, preferably 10% to 35% by weight, particularly preferably 15% to 30% by weight, based on the total weight of the coating.

An extensive overview of pigments and fillers for coatings can be found in the "Lehrbuch der Lacke und Beschichtungen, Band II, Pigmente, Fifilstoffe, Farbstoffe" [Textbook on Paints and Coatings, volume II, Pigments, Fillers, Dyes], H. Kittel, Verlag W.A. Colomb in der Heenemann GmbH, Berlin-Oberschwandorf, 1974, pp. 17-265.

Preferred Embodiments

In one preferred embodiment, the coating comprises
10% to 80% by weight of the polyurea compound according to the invention,
0.5% to 40% by weight of solvent,
5% to 40% by weight of pigments,
0.5% to 15% by weight of coatings additives,
1% to 30% by weight of filler, and
0.001% to 5% by weight of crosslinking catalyst,
in each case based on the total weight of the coating. The components mentioned preferably add up to 100% by weight.

Use as a Binder

The invention also relates to the use of the compound according to the invention as a binder in a moisture-curing coating. The use of the compound according to the invention preferably serves to improve the gloss value of the coating. This is in particular an improvement in the gloss value measured in accordance with DIN EN ISO 2813. The coating is preferably a moisture-curing coating for the production of a topcoat for an anticorrosion system.

EXAMPLES

Synthesis of Alkoxysilane-Modified Polyurea Compounds

A flask with a thermometer, precision glass stirrer, reflux condenser and dropping funnel was initially charged with polyisocyanate and 1-methoxy-2-propyl acetate (MPA) (approx. 20-25% by weight of the amount of polyisocyanate used) under a nitrogen atmosphere at room temperature. Then, di-n-butylamine was first added dropwise within 20-45 min at room temperature, in the event the material contains di-n-butylamine. As a result of the exothermicity of the reaction, the temperature of the reaction mixture rises to 40-50° C. After the theoretically expected isocyanate content had been reached, the reaction mixture was heated to 50° C. If the mixture had a very high viscosity, additional MPA was added before further reaction. Then, diethyl N-(3-triethoxysilylpropyl)aspartate (prepared according to DE 4237468 A1, example 1) and/or diethyl N-(3-diethoxymethylsilylpropyl)aspartate (prepared analogously to DE 4237468 A1, example 1) was added dropwise within 60 minutes at 50° C. and stirring was continued until no significant NCO content was detectable any longer according to IR spectroscopy or by means of NCO titration. Gradual addition of further MPA was used to adjust the reaction mixture to a viscosity of 3000 to 4000 mPas at 23° C.

The NCO contents were determined according to DIN EN ISO 11909.

All the viscosity measurements were made with a Physica MCR 51 rheometer from Anton Paar GmbH (Germany) according to DIN EN ISO 3219.

The number- and weight-average molecular weight was determined by gel permeation chromatography (GPC) in tetrahydrofuran at 23° C. according to DIN 55672-1.

Desmodur XP 2565 is a polyisocyanate based on isophorone diisocyanate with isocyanurate and allophanate groups. NCO content approx. 12.0%.

Desmodur N 3300 is a polyisocyanate based on hexamethylene diisocyanate with isocyanurate groups. NCO content approx. 21.8%.

The following example compounds were prepared in accordance with the abovementioned preparation process.

Example 1 (Example According to the Invention)

Desmodur XP 2565 80% in butyl acetate: 436.25 g (1.25 eq. of NCO)
Diethyl N-(3-diethoxymethylsilylpropyl)aspartate: 476.10 g (1.25 eq. of amine)
1-Methoxy-2-propyl acetate (MPA): 187.78 g
Viscosity of the end product: 3170 mPas
Polymer content of the end product: 75%
Number-average molar mass $M_n$ according to GPC: 1714 g/mol
Weight-average molar mass $M_w$ according to GPC: 2055 g/mol
Silicon content based on solids: 4.24%
Ethoxysilane functionality based on solids: 3.03 eq/kg

Example 2 (Example According to the Invention)

Desmodur XP 2565 80% in butyl acetate: 418.80 g (1.20 eq. of NCO)
Diethyl N-(3-triethoxysilylpropyl)aspartate: 247.70 g (0.60 eq. of amine)
Diethyl N-(3-diethoxymethylsilylpropyl)aspartate: 228.50 g (0.60 eq. of amine)
1-Methoxy-2-propyl acetate (MPA): 157.06 g
Viscosity of the end product: 2970 mPas
Polymer content of the end product: 77%
Number-average molar mass $M_n$ according to GPC: 1481 g/mol
Weight-average molar mass $M_w$ according to GPC: 1945 g/mol
Silicon content based on solids: 4.16%
Ethoxysilane functionality based on solids: 3.72 eq/kg

Example 3 (Example According to the Invention)

Desmodur XP 2565 80% in butyl acetate: 1047.00 g (3.00 eq. of NCO)
Diethyl N-(3-diethoxymethylsilylpropyl)aspartate: 759.57 g (2.10 eq. of amine)
Di-n-butylamine: 116.32 g (0.90 eq. of amine)
Viscosity of the end product: 3390 mPas
Polymer content of the end product: 73%
Number-average molar mass $M_n$ according to GPC: 1420 g/mol
Weight-average molar mass $M_w$ according to GPC: 1684 g/mol
Silicon content based on solids: 3.43%
Ethoxysilane functionality based on solids: 2.45 eq/kg

Example 4 (Example According to the Invention)

Desmodur XP 2565 80% in butyl acetate: 349.0 g (1.0 eq. of NCO)
Diethyl N-(3-triethoxysilylpropyl)aspartate: 355.77 g (0.90 eq. of amine)
Diethyl N-(3-diethoxymethylsilylpropyl)aspartate: 36.30 g (0.10 eq. of amine)
1-Methoxy-2-propyl acetate (MPA): 130.71 g
Viscosity of the end product: 2850 mPas
Polymer content of the end product: 77%
Number-average molar mass $M_n$ according to GPC: 1688 g/mol
Weight-average molar mass $M_w$ according to GPC: 1950 g/mol
Silicon content based on solids: 3.32%
Ethoxysilane functionality based on solids: 4.32 eq/kg

Example 5 (Example According to the Invention)

Desmodur XP 2565 80% in butyl acetate: 349.00 g (1.00 eq. of NCO)
Diethyl N-(3-triethoxysilylpropyl)aspartate: 296.48 g (0.75 eq. of amine)
Diethyl N-(3-diethoxymethylsilylpropyl)aspartate: 90.83 g (0.25 eq. of amine)
1-Methoxy-2-propyl acetate (MPA): 118.19 g
Viscosity of the end product: 3380 mPas
Polymer content of the end product: 78%
Number-average molar mass $M_n$ according to GPC: 1643 g/mol
Weight-average molar mass $M_w$ according to GPC: 1954 g/mol
Silicon content based on solids: 4.20%
Ethoxysilane functionality based on solids: 4.13 eq/kg

Example 6 (Comparative Example)

Desmodur XP 2565 80% in butyl acetate: 875.00 g (2.5 eq. of NCO)
Diethyl N-(3-triethoxysilylpropyl)aspartate: 1017.50 g (2.5 eq. of amine)
1-Methoxy-2-propyl acetate (MPA): 254.4 g
Viscosity of the end product: 3030 mPas
Polymer content of the end product: 80%
Number-average molar mass $M_n$ according to GPC: 1583 g/mol
Weight-average molar mass $M_w$ according to GPC: 1937 g/mol
Silicon content based on solids: 4.08%
Ethoxysilane functionality based on solids: 4.37 eq/kg

Example 7 (Comparative Example)

Desmodur XP 2565 80% in butyl acetate: 523.50 g (1.00 eq. of NCO)
Diethyl N-(3-triethoxysilylpropyl)aspartate: 487.08 g (0.75 eq. of amine)
1-Methoxy-2-propyl acetate (MPA): 210.17 g
Viscosity of the end product: 1580 mPas
Polymer content of the end product: 75%
Number-average molar mass $M_n$ according to GPC: 1505 g/mol
Weight-average molar mass $M_w$ according to GPC: 1855 g/mol
Silicon content based on solids: 3.56%
Ethoxysilane functionality based on solids: 3.81 eq/kg

Example 8 (Comparative Example)

Desmodur XP 2565 80% in butyl acetate: 187.50 g (0.54 eq. of NCO)
Desmodur N 3300 50.00 g (0.26 eq. of NCO)
Diethyl N-(3-triethoxysilylpropyl)aspartate: 223.94 g (0.56 eq. of amine)

Di-n-butylamine: 31.02 g (0.24 eq. of amine)

Viscosity of the end product: 3170 mPas

Polymer content of the end product: 76%

Number-average molar mass $M_n$ according to GPC: 1562 g/mol

Weight-average molar mass $M_w$ according to GPC: 2013 g/mol

Silicon content based on solids: 3.45%

Ethoxysilane functionality based on solids: 3.69 eq/kg

Production of Pigmented Topcoats

The alkoxysilane-modified polyurea compounds (STP) described above were used as binder for producing pigmented topcoats the composition of which can be seen in the following table. Unless otherwise stated, the starting weight of STP is based on the weight of the STP including solvent. Prior to processing, 1% by weight of 1,8-diazabicyclo[5.4.0]undec-7-ene (DBU), based on the starting weight of, was added as crosslinking catalyst to the alkoxysilane-modified polyurea compounds (STP) and the mixture was mixed well by hand.

The topcoats were produced at room temperature by adding component 1 into a cooled vessel (twin-wall vessel with external cooling via cold tap water). Component 2 was added and the resulting mixture was dispersed at approx. 600-800 rpm using a dissolver until homogeneous. Component 3 was then added with slow stirring (approx. 600-800 rpm) and then dispersed at 2800 rpm for 30 minutes.

The topcoats were processed after a ripening time of one day.

The coatings A and B shown in the following table contain vinyltrimethoxysilane (Dynasylan VTMO) as water scavenger.

| Topcoat | A | B* |
|---|---|---|
| Component 1 | | |
| STP | 3 | 6 |
| Starting weight of STP | 436.0 | 412.7 |
| Disperbyk 161 (wetting and dispersing additive) | 11.5 | 11.5 |
| Dynasylan VTMO (water scavenger) | 4.0 | 4.0 |
| Byk 141 (defoamer) | 3.0 | 3.0 |
| Tinuvin 292 (light stabilizer) | 3.0 | 3.0 |
| Component 2 | | |
| Aerosil R 972 (thixotropic agent) | 5.4 | 5.4 |
| Bentone SD 2 (thixotropic agent) | 7.3 | 7.3 |
| MPA (solvent) | 65.2 | 194.8 |
| Component 3 | | |
| Tronox R-KB-4 (pigment) | 194.8 | 194.8 |
| Barium sulfate EWO (filler) | 84.0 | 82.4 |

*Comparative example

The coatings C to G shown in the following table contain vinyltriethoxysilane (Dynasylan VTEO) as water scavenger.

| Topcoat | C | D | E | F | G* |
|---|---|---|---|---|---|
| Component 1 | | | | | |
| STP | 4 | 5 | 2 | 3 | 8* |
| Starting weight of STP | 545.0 | 545.0 | 545.0 | 545.0 | 545.0 |
| Disperbyk 161 (wetting and dispersing additive) | 14.4 | 14.4 | 14.4 | 14.4 | 14.4 |
| Dynasylan VTEO (water scavenger) | 5.0 | 5.0 | 5.0 | 5.0 | 5.0 |
| Byk 141 (defoamer) | 5.0 | 5.0 | 5.0 | 5.0 | 5.0 |
| Tinuvin 292 (light stabilizer) | 4.0 | 4.0 | 4.0 | 4.0 | 4.0 |
| Component 2 | | | | | |
| Aerosil R 972 (thixotropic agent) | 6.7 | 6.7 | 6.7 | 6.7 | 6.7 |
| Bentone SD 2 (thixotropic agent) | 9.1 | 9.1 | 9.1 | 9.1 | 9.1 |
| MPA (solvent) | 60.0 | 60 | 60 | 60 | 60 |
| Component 3 | | | | | |
| Tronox R-KB-4 (pigment) | 243.5 | 243.5 | 243.5 | 243.5 | 243.5 |
| Barium sulfate EWO (filler) | 125.0 | 130.0 | 125.0 | 105.0 | 120.0 |

*Comparative test

The coatings H and I shown in the following table contain vinyltrimethoxysilane (Dynasylan VTMO) as water scavenger and each feature STPs having the same ethoxysilane density based on the polymer material.

| Topcoat | H | I* |
|---|---|---|
| Component 1 | | |
| STP | 2 | 7* |
| Starting weight of STP | 928.6 | 619.1 |
| DBU, as supplied | 9.28 | 6.19 |
| Disperbyk 161 (wetting and dispersing additive) | 25.9 | 17.3 |
| Dynasylan VTMO (water scavenger) | 9.0 | 6.0 |
| Byk 141 (defoamer) | 6.7 | 4.4 |
| Tinuvin 292 (light stabilizer) | 6.7 | 4.4 |
| Component 2 | | |
| Aerosil R 972 (thixotropic agent) | 12.1 | 8.1 |
| Bentone SD 2 (thixotropic agent) | 16.3 | 10.9 |
| MPA (solvent) | 81.0 | 33.6 |
| Component 3 | | |
| Tronox R-KB-4 (pigment) | 438.3 | 292.2 |
| Barium sulfate EWO (filler) | 189.0 | 114.0 |

*Comparative test with exclusively triethoxysilane groups

Determination of the Gloss Values 100 g of each of the pigmented topcoats listed above were diluted with 10 g of MPA. To this end, 1% by weight of DBU based on the starting weight of STP was added as catalyst, based on the weight of the STP. This mixture was mixed well by hand for 1 min. For gloss measurements, the topcoats were applied to a glass plate using a doctor blade (180 μm wet film thickness). The coatings were dried for 7 days at room temperature. Thereafter, the gloss values were determined at an angle of incidence of 60° by means of a reflectometer in accordance with the standard DIN EN ISO 2813.

The gloss values thus determined for coatings A and B are reported in the following table.

| Topcoat | Gloss value (60°) |
|---|---|
| A | 83 |
| B* | 70 |

*Comparative test with exclusively triethoxysilane groups

Product A, which contains diethoxymethyl groups, displays a substantially higher gloss as a coating than a material containing only triethoxysilane groups (B).

In the same way, further coatings were produced on glass using the topcoats C to G. The sole variation is the use in these coatings, in place of the water scavenger vinyltrimethoxysilane (Dynasylan VTMO), of a comparable amount of vinyltriethoxysilane (Dynasylan VTEO).

1% by weight of DBU based on the starting weight of STP was added as catalyst to each of the coatings. This mixture was mixed well by hand for 1 min and subsequently applied to glass as described above and the gloss value was measured after 7 days:

| Coating | Gloss value (60°) |
| --- | --- |
| C | 82 |
| D | 80 |
| E | 78 |
| F | 82 |
| G* | 68 |

*Comparative test with exclusively triethoxysilanes

The table shows that silane-terminated prepolymers having diethoxymethyl groups achieve markedly higher gloss values than the corresponding products containing only triethoxysilane groups.

Even the products containing only few diethoxymethylsilane groups in addition to triethoxysilane groups produce significantly higher gloss values than the comparison, which contains exclusively triethoxysilane groups.

In a further series of tests, the above mentioned coatings C to G were analyzed on glass, in the case of which instead of the catalyst DBU an identical amount of 5-diazabicyclo[4.3.0]non-5-ene (DBN) was used.

Prior to processing, the corresponding coating was diluted with 10% of MPA. The coatings are applied to glass as described above and the gloss value is measured after 7 days:

| Coating | Gloss value (60°) |
| --- | --- |
| C | 82 |
| D | 81 |
| E | 79 |
| F | 82 |
| G* | 68 |

*Comparative test with exclusively triethoxysilanes

The table shows that, even when using DBN as cross-linking catalyst, silane-terminated prepolymers having diethoxymethyl groups achieve markedly higher gloss values than the corresponding products containing only triethoxysilane groups. Even the products containing only few diethoxymethylsilane groups in addition to triethoxysilane groups produce significantly higher gloss values than the comparison, which contains exclusively triethoxysilane groups.

In the same way, further coatings were produced on glass using the topcoats H and I. Prior to processing, the corresponding coating was diluted with 10% of MPA. As described above, the topcoat formulations are coated onto glass and examined after 7 days. The gloss values achieved are shown in the following table.

| Coating | Equivalent SiOEt groups/kg of polymer | Gloss (60°) |
| --- | --- | --- |
| H | 3.72 | 80 |
| I* | 3.81 | 74 |

* Comparative example

This example shows that coatings containing dialkoxysilane groups (coating H) with almost identical ethoxysilane density display better gloss values than coatings having exclusively trialkoxysilane groups.

The comparison of the abovementioned coatings E and G also leads to the same result.

Analysis in a Multilayer Construction

Two topcoats based on diethoxymethylsilane groups (J and K) were analyzed in a two-layer construction on aluminum and also in a three-layer construction on steel. The formulations of the two topcoats are listed in the following table.

| Topcoat | J | K |
| --- | --- | --- |
| Component 1 | | |
| STP | 1 | 2 |
| Starting weight of STP | 773.9 | 773.9 |
| Disperbyk 161 (wetting and dispersing additive) | 21.6 | 21.6 |
| Dynasylan VTMO (water scavenger) | 7.5 | 7.5 |
| Byk 141 (defoamer) | 5.6 | 5.6 |
| Tinuvin 292 (light stabilizer) | 5.6 | 5.6 |
| Component 2 | | |
| Aerosil R 972 (thixotropic agent) | 10.1 | 10.1 |
| Bentone SD 2 (thixotropic agent) | 13.6 | 13.6 |
| MPA (solvent) | 67.5 | 67.5 |
| Component 3 | | |
| Tronox R-KB-4 (pigment) | 365.2 | 365.2 |
| Barium sulfate EWO (filler) | 139.5 | 157.5 |

1% by weight of DBU based on the starting weight of STP was added as catalyst to each of the coatings described above, based on the weight of the STP. This mixture was mixed well by hand for 1 min.

Spray Application

The spray application was effected using a SATAjet RP 3000 type spray gun with a 1.6 mm SATA spray nozzle at a pressure of approx. 2.1 to 2.2 bar. Coating was effected under the existing ambient climate (slight fluctuations in temperature and air humidity possible). Depending on the solids content of the binder, the coating systems were diluted between 5% to 10% with the solvent that was already present in the coating system. This solvent is usually MPA.

Two-Layer Construction on Aluminum

A polyurethane-containing intermediate coating of the guide formula from Covestro Deutschland AG with the designation RR 5282 was applied, by means of the spray application described, to an aluminum sheet and dried. Next, the topcoat was applied by means of spray application and dried.

The multilayer construction was produced by spray application. After 7 days of storage, the gloss of the coating obtained was tested.

| Test | Gloss value (60°) |
|---|---|
| J | 84 |
| K | 83 |

The silane-terminated prepolymers according to the invention also produce very good gloss values on an intermediate layer.

Three-Layer Construction on Steel

First, a one-component PUR basecoat was applied to a steel sheet (blasted to SA 2½) by means of the spray application described and was subsequently dried at room temperature. The basecoat used is a one-component PUR zinc dust basecoat according to the guide formula from Covestro Deutschland AG with the designation RR 5280. After drying this basecoat, for the next layer a polyurethane-containing intermediate coat of the guide formula from Covestro Deutschland AG with the designation RR 5282 was applied and dried. The topcoat was likewise applied using the spray application described and dried.

The two cured coatings were then subjected to both a condensation water test and a salt spray test.

Condensation Water Test According to DIN EN ISO 6270-2 CH

Demineralized water was heated to +40° C. and evaporated in a closed testing apparatus. This resulted in a condensing humidity in the testing apparatus of 100%. Heat was released to the outside, resulting in the temperature dropping below the dew point. Water vapor condensed on the samples.

The test duration was 1008 h. Interim inspection was performed after defined times. In addition, a final inspection was also performed after the arranged test duration. This involved examining the samples visually for surface changes such as cracks, craters and blistering.

For the three-layer construction on steel described above, no surface changes were detected for the two STP-containing coatings after 42 days.

Salt Spray Test According to DIN EN ISO 9227 NSS

A 5% sodium chloride solution was sprayed at 35° C. into a closed testing apparatus. The sprayed aerosol resulted in a corrosion-promoting salt mist atmosphere with a condensing humidity of 100% in the testing apparatus.

Testing was effected using a DIN cut. The test duration was 1440 h. Interim inspection was performed after defined times and a check of the sub-film corrosion at the DIN cut was performed at the end of the test duration. There was also a final inspection after the arranged test duration. This involved examining the samples visually for surface changes such as cracks, craters and blistering.

For the three-layer construction on steel described above, no surface changes were detected for the two STP-containing coatings after 60 days.

The results show that the STPs according to the invention contribute to obtaining resistant anticorrosion formulations.

The invention claimed is:

1. A polyurea compound prepared via reaction of a polyisocyanate with a dialkoxyaminosilane of general formula (I)

$$R^1(R^1O)_2Si(CH_2)_mNHR^2 \quad (I)$$

and optionally additionally with a trialkoxyaminosilane of general formula (II)

$$(R^1O)_3Si(CH_2)_nNHR^2 \quad (II)$$

where the radicals $R^1$ independently of one another are selected from $C_1$-$C_{20}$-alkyl or $C_6$-$C_{20}$-aryl, n and m are each integers between 1 and 4, the radicals $R^2$ independently of one another are selected from —H, $C_1$-$C_{20}$-alkyl, $C_3$-$C_{12}$-cycloalkyl, and —$CHR^3CH_2COOR^4$, the radicals $R^3$ independently of one another are selected from H, $C_1$-$C_{20}$-alkyl and —$COOR^4$, and the radicals $R^4$ independently of one another represent $C_1$-$C_{20}$-alkyl, wherein the radicals $R^2$ each represent —$CHR^3CH_2COOR^4$ and the radicals $R^3$ each represent —$COOR^4$.

2. The compound as claimed in a claim 1, wherein the proportion of dialkoxyaminosilanes of general formula (I), based on the total molar amount of aminosilanes of general formulae (I) and (II), is 5 to 90 mol %.

3. The compound as claimed in claim 1, wherein the compound has a content of free NCO groups of less than 0.2% by weight.

4. The compound as claimed in claim 1, wherein the compound has a silicon content of 0.1% to 5% by weight.

5. The compound as claimed in claim 1, wherein the compound has a number-average molecular weight of 300 to 5000 g/mol.

6. The compound as claimed in claim 1, wherein the radicals $R^1$ independently of one another are selected from methyl and ethyl.

7. The compound as claimed in claim 1, wherein the polyisocyanate is an oligomeric polyisocyanate based on isophorone diisocyanate or hexamethylene diisocyanate.

8. The compound as claimed in claim 1, wherein the polyisocyanate is an oligomeric diisocyanate based on isophorone diisocyanate and having at least one isocyanurate, biuret, allophanate and/or uretdione structural unit.

9. A moisture-curing coating comprising the compound as claimed in claim 1 and a crosslinking catalyst.

10. The coating as claimed in claim 9, comprising
10% to 80% by weight of the compound,
0.5% to 40% by weight of solvent,
5% to 40% by weight of pigments,
0.5% to 15% by weight of coatings additives,
1% to 30% by weight of filler, and
0.001% to 5% by weight of crosslinking catalyst,
in each case based on the total weight of the coating.

11. A method comprising utilizing the compound as claimed in claim 1 as a binder for a moisture-curing coating.

12. The method as claimed in claim 11 for improving the gloss value of the coating.

13. The method as claimed in claim 11, wherein the binder serves to produce a topcoat in an anticorrosion system.

14. A process for preparing a polyurea compound comprising alkoxysilane groups by
a) providing a polyisocyanate,
b) reacting at least a portion of the NCO groups of the polyisocyanate with a dialkoxyaminosilane of general formula (I)

$$R^1(R^1O)_2Si(CH_2)_mNHR^2 \quad (I)$$

c) optionally reacting a portion of the NCO groups of the polyisocyanate with a trialkoxyaminosilane of general formula (II)

$$(R^1O)_3Si(CH_2)_nNHR^2 \quad (II)$$

where the radicals $R^1$ independently of one another are selected from $C_1$-$C_{20}$-alkyl or $C_6$-$C_{20}$-aryl, n and m are each integers between 1 and 4, the radicals $R^2$ independently of one another are selected from —H, $C_1$-$C_{20}$-alkyl, $C_3$-$C_{12}$-cycloalkyl, and —$CHR^3CH_2COOR^4$, the radicals $R^3$ independently of one another are selected from H, $C_1$-$C_{20}$-alkyl and —$COOR^4$, and the radicals $R^4$ independently of one another represent $C_1$-$C_{20}$-alkyl, wherein the radicals $R^2$ each represent —$CHR^3CH_2COOR^4$ and the radicals $R^3$ each represent —$COOR^4$.

\* \* \* \* \*